(12) United States Patent
Vogt et al.

(10) Patent No.: US 8,692,163 B2
(45) Date of Patent: Apr. 8, 2014

(54) ELECTRICAL HEATER FOR INJECTION-MOLDING NOZZLE

(75) Inventors: Martin Vogt, Iserlohn (DE); Bernward Seeberg, Iserlohn (DE)

(73) Assignee: Hotset Heizpatronen und Zubehoer GmbH, Luedenscheid (DE)

( * ) Notice: Subject to any disclaimer, the term of this patent is extended or adjusted under 35 U.S.C. 154(b) by 301 days.

(21) Appl. No.: 13/187,557

(22) Filed: Jul. 21, 2011

(65) Prior Publication Data

US 2012/0189288 A1    Jul. 26, 2012

(30) Foreign Application Priority Data

Jul. 23, 2010  (DE) .................... 20 2010 010 581 U

(51) Int. Cl.
| | | |
|---|---|---|
| *B29C 45/27* | (2006.01) | |
| *B29C 45/74* | (2006.01) | |
| *B29C 45/78* | (2006.01) | |
| *G01K 1/14* | (2006.01) | |
| *G01K 13/02* | (2006.01) | |
| *G01K 7/02* | (2006.01) | |
| *H05B 3/06* | (2006.01) | |
| *B67D 7/82* | (2010.01) | |

(52) U.S. Cl.
USPC ...... 219/421; 219/425; 219/535; 264/328.15; 425/549; 222/146.5; 374/147

(58) Field of Classification Search
None
See application file for complete search history.

(56) References Cited

U.S. PATENT DOCUMENTS

| 4,711,625 | A  | * | 12/1987 | Knauer et al. | 425/549 |
|---|---|---|---|---|---|
| 6,155,815 | A  | * | 12/2000 | Crandell | 425/549 |
| 6,945,768 | B2 | * | 9/2005 | Babin et al. | 425/549 |
| 8,247,739 | B2 | * | 8/2012 | Schlipf | 219/264 |
| 2005/0048161 | A1 | * | 3/2005 | Trakas | 425/549 |
| 2010/0092595 | A1 | * | 4/2010 | Gunther | 425/170 |

FOREIGN PATENT DOCUMENTS

DE         202008013626 B        3/2009

\* cited by examiner

*Primary Examiner* — Joseph M Pelham
(74) *Attorney, Agent, or Firm* — Andrew Wilford

(57) ABSTRACT

An electrical sleeve heater for heating an elongated part has a metallic and tubular casing extending coaxially along an axis with the part and surrounding the part. The casing has a front end is with a radially inwardly open cutout. A electrical heating element set in the casing is energizeable to heat the casing and the part surrounded by the casing. A thermocouple has a sensing tip in the cutout. A retaining body of at most low thermal conductivity is fitted in the cutout, holds the tip out of contact with the metallic casing, and urges the tip radially inward into direct engagement with an outer surface of the part. The retaining body is a molded part, a plate, or a spring of a material with low or negligible thermal conductivity.

11 Claims, 5 Drawing Sheets

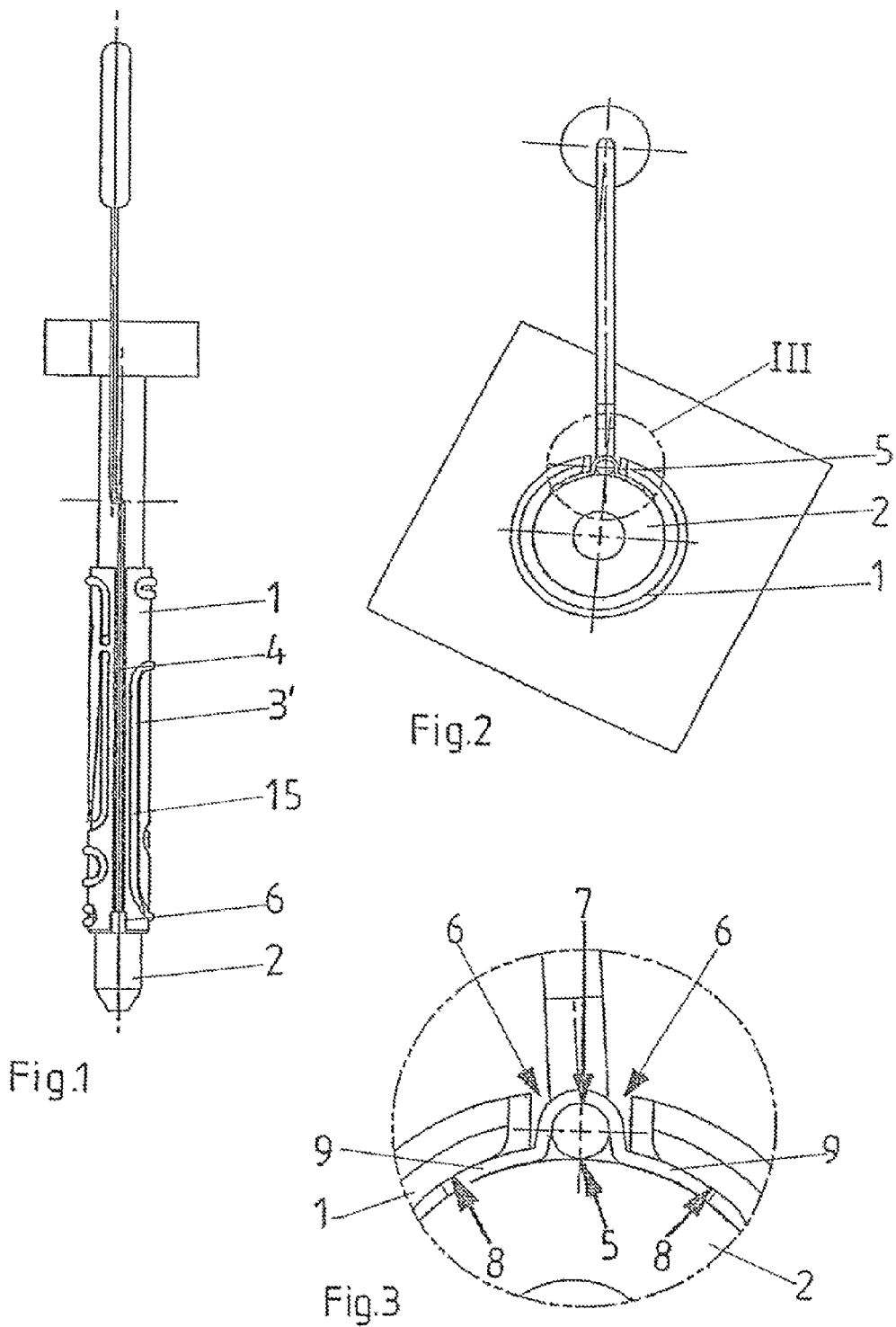

ELECTRICAL HEATER FOR INJECTION-MOLDING NOZZLE

FIELD OF THE INVENTION

The present invention relates to an electric heater. More particularly this invention concerns such a sleeve heater for an injection-molding nozzle.

BACKGROUND OF THE INVENTION

An electric sleeve heater, in particular for heating a spray nozzle of an injection-molding or die-casting machine, in particular for plastic extruders, has a tubular casing of metal that is fitted over the part to be heated and in which an electric heating element is imbedded, as well as a thermocouple as a temperature sensor whose sensor tip is positioned at an end of the tubular casing such that it is in heat-conducting contact with the outer surface of the part being heated.

A corresponding electric sleeve heater is known from US 2010/0092595 (DE 20 2006 018 576). Here, a radially through going hole in the wall of the tubular casing is provided near and end region, in or through which through a free end of the temperature sensor or a portion near the free end of the temperature sensor, is guided. The part being heated is formed by a steel tube, while the tubular casing can be produced from copper or a copper alloy.

Since in this embodiment there is a spacing between the sensor tip and the outer surface of the part being heated, this free end of the temperature sensor, that is, the sensor tip, can be fixed by a holding element that when installed ensures contact between the free end of the temperature sensor and the part being heated. The holding element should thereby be a clamp made of temperature-resistant spring steel.

An embodiment of this type is disadvantageous in that there is a direct heat-conducting connection between the sensor tip of the thermocouple and the electrical heater. This direct contact is formed in part by the outer surface of the tubular casing of metal or also by the additionally provided metallic spring. As a result, this means that the temperature that the sensor tip of the thermocouple measures is not exactly the temperature of the part being heated in the region of the sensor tip. Instead, this measured value is distorted by heat conduction between the tubular casing of metal and the sensor tip or between the tubular casing of metal, the metal spring and the sensor tip.

An embodiment is known from DE 20 2008 013 626, in which the sensor tip of the thermocouple is fixed in heat-transmitting manner in a groove of a wall of the tube and is separated from the tube wall laterally by front-side indentations, that is, from the tubular casing of metal.

Here there is still direct heat-conducting contact between the tube wall section and the tubular casing, so that this again results in a distortion of the measured value that is recorded by the temperature sensor with the sensor tip on the outer surface of the part to be measured.

An arrangement is also hereby provided in which in addition a spring steel sheet is to be provided in order to press the exposed tube wall section against the part being heated and likewise to press the tip of the thermocouple against the part being heated. Here, too, there is again a heat-conducting connection between the tubular casing of metal and the sensor tip of the thermocouple, so that distortions of the measured values again result from this.

OBJECTS OF THE INVENTION

It is therefore an object of the present invention to provide an improved sleeve heater for an injection-molding nozzle.

Another object is the provision of such an improved sleeve heater for an injection-molding nozzle that overcomes the above-given disadvantages, in particular in which the actual temperature of the part being heated can be detected with high accuracy by the thermocouple, in particular by the sensor tip of the thermocouple, without this measured value being influenced by the temperature of the tubular casing of metal or other elements.

SUMMARY OF THE INVENTION

An electrical sleeve heater for heating an elongated part has according to the invention a metallic and tubular casing extending coaxially along an axis with the part and surrounding the part. The casing has a front end is with a radially inwardly open cutout. A electrical heating element set in the casing is energizeable to heat the casing and the part surrounded by the casing. A thermocouple has a sensing tip in the cutout. A retaining body of at most low thermal conductivity is fitted in the cutout, holds the tip out of contact with the metallic casing, and urges the tip radially inward into direct engagement with an outer surface of the part. The retaining body is a molded part, a plate, or a spring of a material with low or negligible thermal conductivity.

According to this embodiment, the sensor tip of the thermocouple is spacedly received in a cutout of the tubular casing, so that there is therefore no contact between this sensor tip and the material of the tubular casing. In this cutout region the retaining body of a material with low thermal conductivity or preferably of a material with no thermal conductivity is provided. This retaining body is arranged and provided such that in the intended mounting position it presses the sensor tip against the outer surface of the part being heated. The retaining body can be composed of hot-forming steel, stainless steel, ceramic or another suitable material.

Contact between the sensor tip of the thermocouple and the outer surface of the part being heated is hereby achieved, and, despite this optionally flexible arrangement, thermal conduction from the tubular casing to the sensor tip of the thermocouple is avoided, since the retaining body is made of a material with low thermal conductivity or preferably with no thermal conductivity. For example, the retaining body can also be made of heat-resistant plastic.

A preferred further development is seen in that the thermocouple is held in a groove and/or in a slot of the tubular casing, that merges into the cutout at the front end of the tubular casing, the retaining body and the sensor tip being arranged in the cutout.

The thermocouple is here held in a groove of the tubular casing in a conventional manner. At the end of the tubular casing, this groove merges into the cutout in which the retaining body and the sensor tip of the thermocouple are arranged. The section ensures that there can be no heat conduction between the sensor tip and the tubular casing. On the other hand, the cutout is suitable and intended for accommodating the retaining body and to hold it in the intended position the sensor tip of the thermocouple pressed by the spring against the part being heated.

In order to achieve an easy and trouble-free arrangement, the outer surface parts of the tubular casing adjacent or abutting the cutout have recessed seats in their surface facing toward the part, which seats accommodate the molded part or arms of the spring or of the plate in a flush manner, and that the retaining body forms a groove open toward the part being heated between these arms, in which groove the sensor tip is arranged.

Preferably, the sensor tip is fixed in the open groove or open bore of the molded part or in the open groove of the plate or of the spring, namely by clamping, attachment by an adhesive, soldering, or welding.

For example, the spring or the plate can be a rectangular element having two arms and forming an open groove centrally between these arms. The arms can be arranged in the recesses of the tubular casing so that they are flush with the inner surface of the tubular casing and do not project, so that no overhang is formed that could cause a spacing of the tubular casing from the part being heated. The corresponding open groove, in which the sensor tip is arranged, is between these arms.

The molded part can be an approximately semicircular part, for example inserted securely against loss into a recess of the outer surface part fitted thereto in terms of shape and has a front face adapted to the part being heated for a snug bearing against the part, in which a groove-shaped recess or open bore is shaped to accommodate the sensor tip.

The sensor tip can thereby be simply inserted into the respective groove or it can also be clamped in the groove, if the groove is shaped accordingly and can hold the sensor tip by spring force, or it can also be connected to the molded part material by adhesive force, for example, by welding or soldering.

Furthermore, the retaining body has a surface adapted to the shape and camber of the part being heated in the bearing region of the sensor tip, the molded part, the plate and/or the spring, which surface in the intended mounting position bears flat against the part being heated.

This arrangement and embodiment ensures that the molded part, the plate, the spring and/or the sensor tip does not only bear in a linear manner against the bearing region of the part being heated, but bears flat against this region, so that a better temperature transmission to the sensor tip and thus a clearer and better measurement of the temperature value can be obtained, as well as an excellent positioning of the parts on the outer surface of the part being heated.

A particularly preferred further development is seen in that the retaining body is made of ceramic material.

This ensures that on the one hand a sufficient force or spring force is available to press the sensor tip in the intended installation position against the part being heated, on the other hand, temperature transmission from the inner surface of the tubular casing to the sensor tip is suppressed by the choice of material.

It is preferably provided that the retaining body is composed of one of the following materials alone or of a combination of such materials:
  Yttrium oxide-stabilized zirconium oxide (Y-TZP),
  Ceroxide-stabilized zirconium oxide (Ce-TZP),
  Magnesium oxide-stabilized zirconium oxide (Mg-PSZ),
  Zirconium-oxide reinforced materials such as zirconium oxide-reinforced aluminum oxide (ZTA) or zirconium oxide-reinforced mullite (ZTM), or
  Silicone nitride.

Slots can be provided on the front face in the tubular casing on both sides next to the cutout, into which the ends of the spring or of a plate of thermally nonconducting material are inserted in order to press the sensor tip against the part being heated.

Under certain circumstances it is preferably provided that the plate or the molded part are rigid parts. Due to the corresponding configuration it is not necessary for these parts to be resilient, they can also be provided as rigid elements.

Optionally, however, the plate or the molded part can be resilient.

A particularly preferred further development is seen in that the groove or the slot of the tubular casing that accommodates the thermocouple has at spacing from the cutout in one region and between the two ends of the tubular casing has a second cutout dimensioned such that the sensor tip of the thermocouple, together with molded part or spring or plate attached thereto, can be inserted through this second cutout.

According to this embodiment, first the sensor tip of the thermocouple can be connected to the molded part, spring or the plate, so that an installation unit is formed. Subsequently, the thermocouple with the sensor tip and the insulating retaining body fitted to it can be fed through the second cutout into the tubular casing and guided to the end thereof, where the retaining body is fitted in the corresponding cutout at the end of the tubular casing. The thermocouple itself is guided over the length of the tubular casing in the corresponding long slot, the long slot being open over the major part of its length and being closed to the outside only in one region that lies near the cutout, so that the thermocouple in the interior wall of the tubular casing lies in a corresponding groove-shaped recess.

BRIEF DESCRIPTION OF THE DRAWING

The above and other objects, features, and advantages will become more readily apparent from the following description, reference being made to the accompanying drawing in which:

FIG. 1 is a side elevational view of an electrical sleeve heater according to the invention;

FIG. 2 is a large-scale end view of the sleeve heater;

FIG. 3 is a large-scale view of the detail indicated at III in FIG. 2;

SPECIFIC DESCRIPTION

Figure 4:
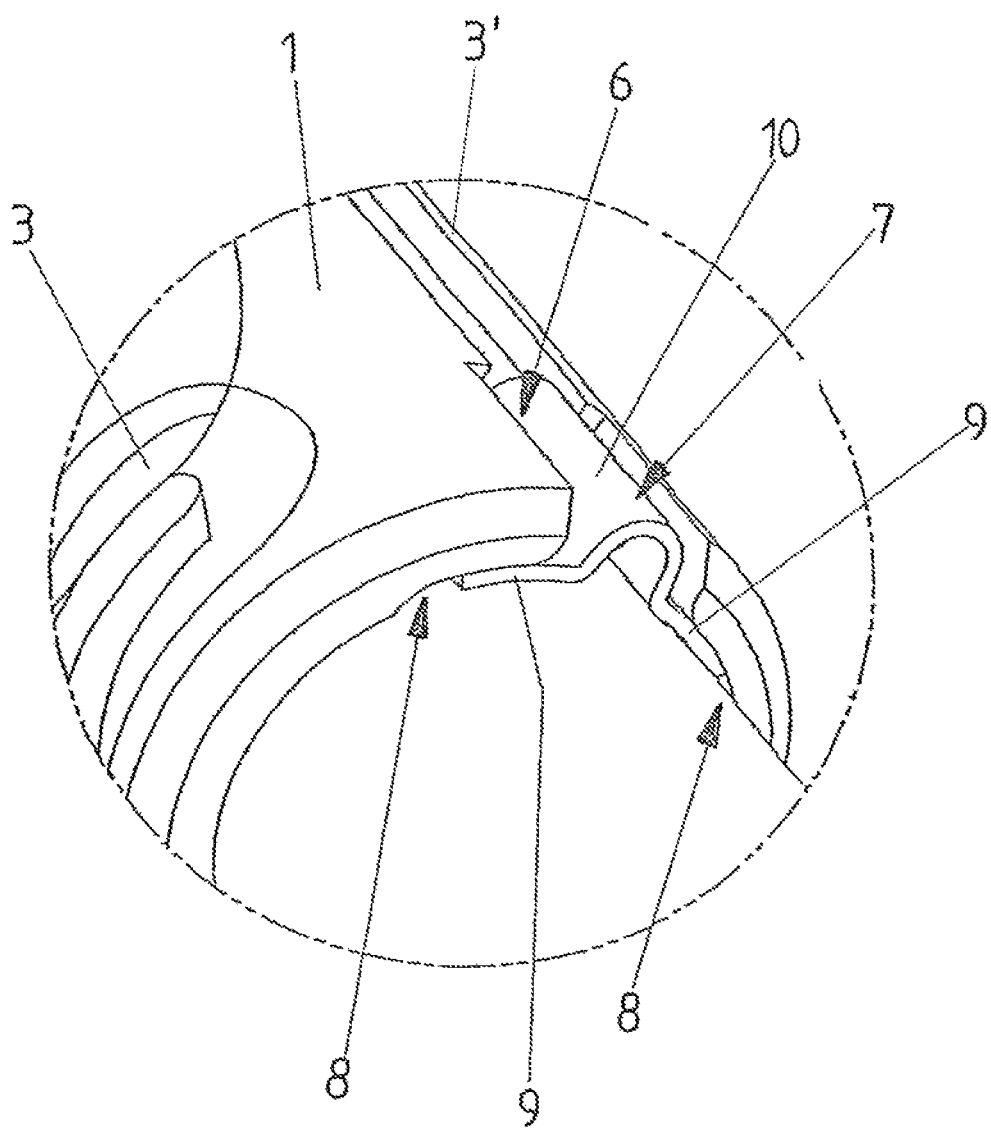
FIG. 4 shows the structure of FIG. 3 in perspective view.

As seen in FIGS. 1-4, an electric sleeve heater is provided for heating a tubular metallic nozzle 2 of a plastics-processing machine. It has a tubular metallic casing 1 that is fitted over the nozzle 2 and that is centered on and extends along the same axis A as this nozzle 2. The casing 1 is formed with a meandering outwardly open groove 3 holding a resistive heating element 15 shown only in FIG. 1. In addition the casing 1 is formed with an axially extending and radially outwardly open slot or groove 3', which may be radially throughgoing, in which is seated a thermocouple 4 having a tip 5 at a radially throughgoing front end 6 of the groove 3'. A spring 7 there presses this tip 5 radially inward against the cylindrical outer surface of the nozzle 2.

The spring 7 is made of a somewhat elastically deformable material of very low thermal conductivity so that the tip 5 will respond to the heat of the nozzle 2 accurately.

More particularly as shown in FIGS. 3 and 4, the end 6 is wider than the groove 3' and the cylindrical inner surface is formed to each side of the widened end 6 with a radially inwardly open seat 8. The spring 7 is basically omega-shaped with a pair of flat angularly extending arms or wings 9 that sit flush in the seats 8 and a central U-section part 10 that fits snugly around the tip 5 of the thermocouple 4 of the thermocouple 4 such that the tip 5 projects slightly inward of the imaginary cylinder formed by the rest of the inner surface of the casing 1 so that it bears directly against the outer surface of the nozzle 2.

The spring 7 is preferably composed of ceramic material, namely:
Ceroxide-stabilized zirconium oxide (Ce-TZP),
Magnesium oxide-stabilized zirconium oxide (Mg-PSZ),
Zirconium-oxide reinforced materials such as zirconium oxide-reinforced aluminum oxide (ZTA) or zirconium oxide-reinforced mullite (ZTM), or
Silicone nitride.

The electrical sleeve heater of this invention ensures that the sensor tip 5 of the thermocouple 4 is positioned and placed in a defined position against the outer surface of the part 2 to be heated, Pressure force is exerted by the ceramic spring 7 and heat transfer from the metallic tubular casing 1 to the sensor tip 5 is suppressed, so that accurate temperature measured values are obtained.

Figure 5:
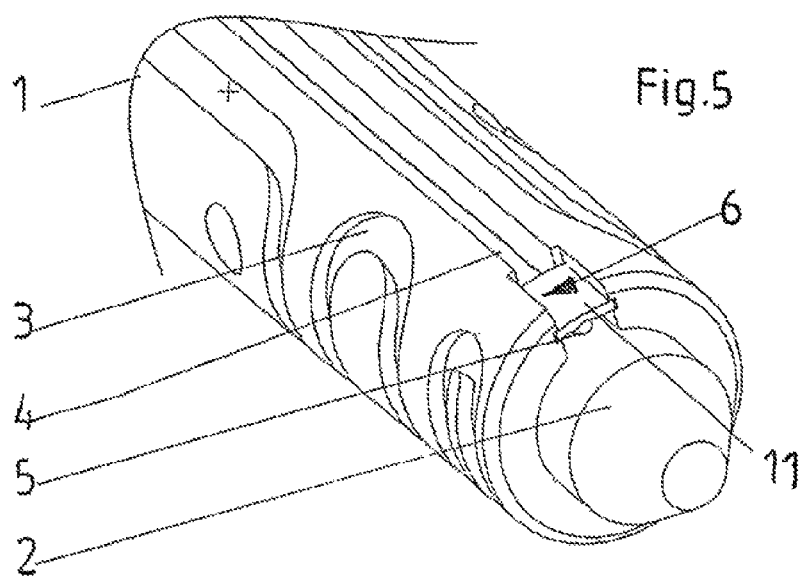
FIGS. 5 and 6 are large-scale perspective end views of a second sleeve heater according to the invention.
Figure 6:
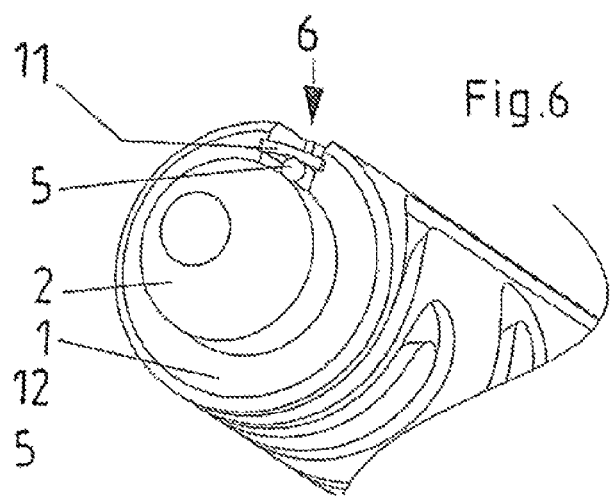
Figure 7:
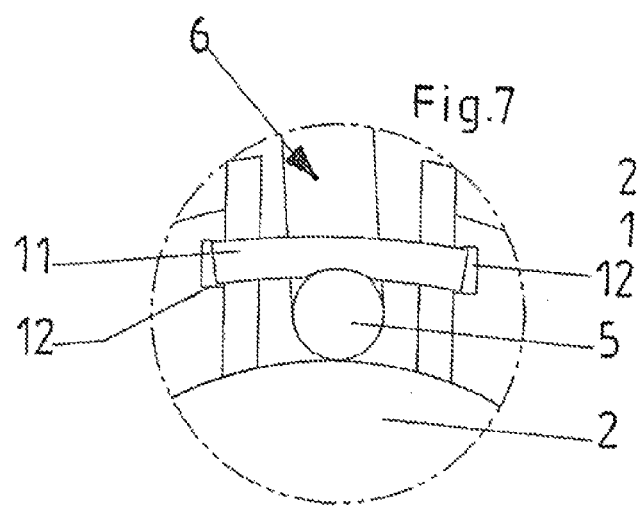
FIG. 7 is a large-scale end view of a detail of FIG. 6.
Figure 8:
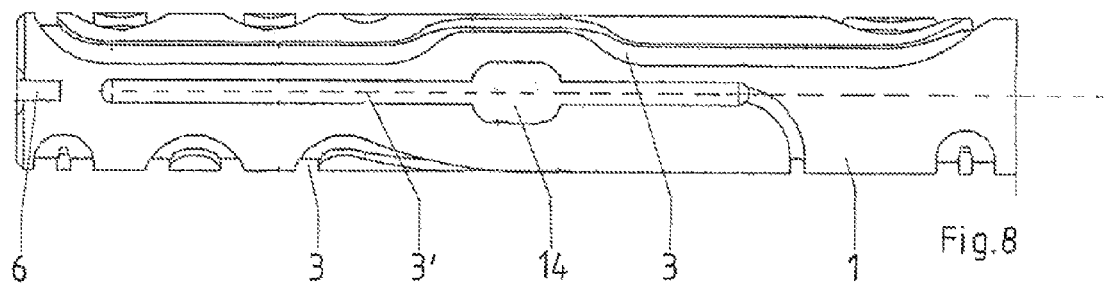
FIG. 8 is a side view of a third sleeve heater according to the invention.
Figure 9:
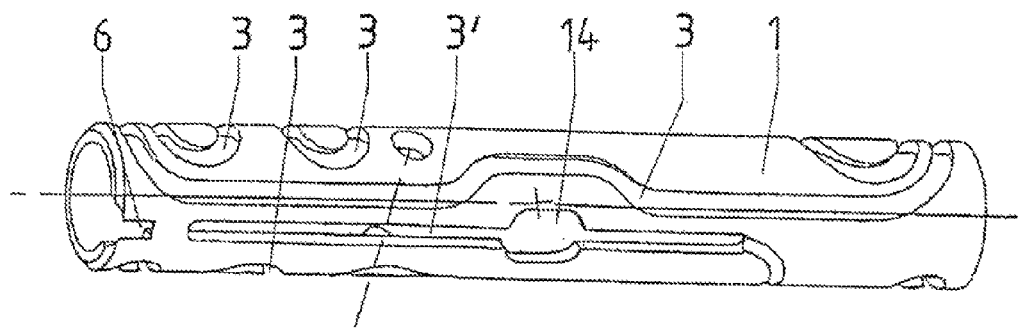
FIG. 9 is a perspective view of the third element of FIG. 8.
Figure 10:
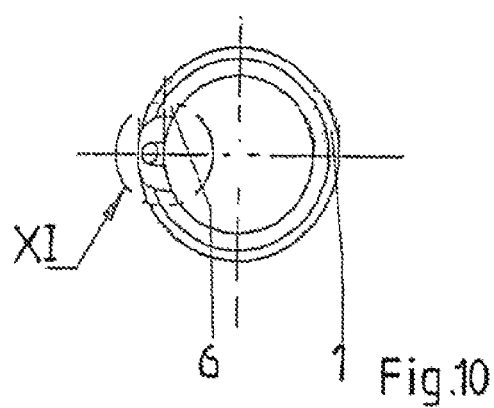
FIG. 10 is an end view of the third element of FIGS. 8 and 9.
Figure 11:
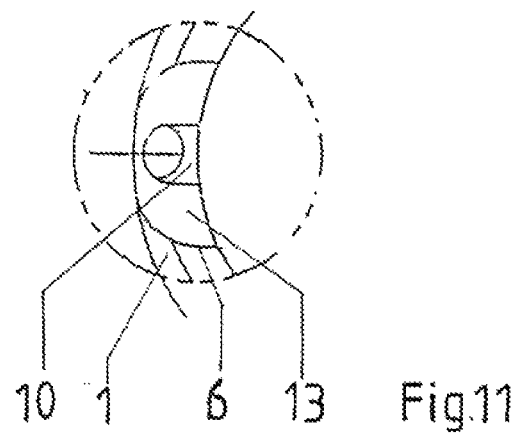
FIG. 11 is a large scale view of the detail indicated at XI in FIG. 10.

In the embodiment that is shown in FIGS. 5 through 7, the spring 7 is a plate-like stiff but elastically limitedly deformable plate 11. The plate 11 of this type can likewise be composed of material with low thermal conductivity or also of material with no conductivity, for example, the above-described ceramic. The use of heat-resistant plastic is also possible as a material for the plate 11. This plate 11 preferably has a notch or a part-cylindrical set in its center, that is where it engages the sensor tip 5 of the thermocouple 4, in order to fix the sensor tip 5. For installation, the plate 11 is inserted from the end into axially forward opening but angularly confronting slots or grooves 12 formed in the edges defining the recess 6. The plate 11 can be fitted in these grooves 12 in a positive or only nonpositive manner. In the illustrated embodiment, the plate 11 bears elastically radially inwardly against the sensor tip 5 to press it against the outer surface of the part 2 being heated. An embodiment of this type is particularly cost-effective in terms of manufacture and can also be used universally.

FIGS. 8 through 12 show an embodiment that is essentially the same as that of FIGS. 1 through 7, and the same reference numbers are used for the same parts. The unillustrated thermocouple is held in the groove 3' here formed as a radially throughgoing slot so that its sensor tip 5 is in the cutout 6. A molded part 13 fitted to the sensor tip 5 of the thermocouple 4, is shown in detail in FIG. 12. This molded part 13 is firmly connected to the sensor tip, for example, soldered or welded.

Figure 12:
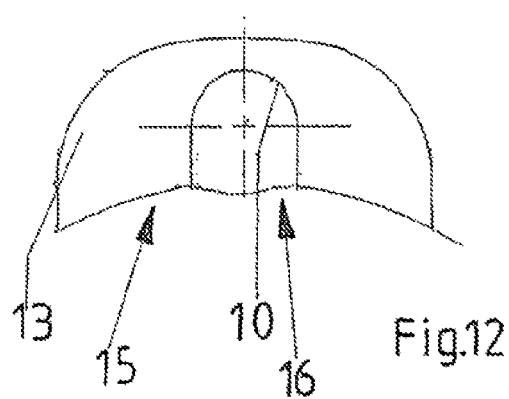
FIG. 12 is large scale view of a detail of a molded part of the third element of FIGS. 8-11.

For assembly, the sensor tip 5 together with the molded part 13 is then fed through a relatively side second cutout 14 of the slot 3'. The second cutout 14 is so wide that the sensor tip 5 together with the molded part 13 can be fed from outside through it and then guided forward inside the tubular casing 1 up to the cutout 6. The longitudinal slot 3' is radially throughgoing only to just before the cutout 6 and continues to the cutout only as a radially inwardly open groove, that is with a web serving to retain the lead of the thermocouple 4 in the groove 3'. The molded part 13 is fitted into the cutout 6 from radially inside, and its shape conforms to that of the cutout 6 so that it sits snugly in the cutout. The inner face 15 of the molded part 13 is of part-cylindrical shape complementary to the outside surface of the nozzle part 2, so that when installed the part 13 is flush with the inner face of the casing 1. In this position, that is when the tubular casing 1 is mounted on the corresponding part 2 to be heated, the molded part 13 together with the sensor tip 5 located therein is fixed against loss. The sensor tip 5 optionally projects slightly radially inward past the inner face 15 at 16 as shown in FIG. 12. This thus makes it clear that the sensor tip 5 bears at 16 bears snugly against the outer surface of the part 2 to be heated, so that unequivocal is measured results can be obtained.

The invention is not restricted to the illustrated embodiments, but is variable in many ways within the scope of the disclosure. All of the individual and combined features disclosed in the specification and/or drawing are considered to be part of the invention.

We claim:

1. An electrical sleeve heater for heating an elongated part, the sleeve heater comprising:
    a metallic and tubular casing extending coaxially along an axis with the part and surrounding the part, the casing having a front end and being formed therewith a radially inwardly open cutout;
    a electrical heating element set in the casing and energizeable to heat the casing and the part surrounded by the casing;
    a thermocouple having a sensing tip in the cutout; and
    a body of lower thermal conductivity than the casing fitted in the cutout, having an inner surface conforming to a shape of an outer face of the part, holding the tip, and urging the tip radially inward into direct engagement with an outer surface of the part, the cutout having angularly confronting edges formed with grooves receiving ends of the body and opening on the edges only angularly into the cutout.

2. The electrical sleeve heater defined in claim 1 wherein the body is formed with a seat in which the tip fits.

3. The electrical sleeve heater defined in claim 2, wherein the tip is gripped, adhered, or welded in the seat.

4. The electrical sleeve heater defined in claim 1 wherein the body is recessed in the casing and the inner surface of the body is generally flush with an inner surface of the casing.

5. The electrical sleeve heater defined in claim 1 wherein the body is ceramic.

6. The electrical sleeve heater defined in claim 5 wherein the body is of
    ceroxide-stabilized zirconium oxide,
    magnesium oxide-stabilized zirconium oxide,
    Zirconium-oxide reinforced aluminum oxide,
    zirconium oxide-reinforced mullite, or
    silicone nitride.

7. The electrical sleeve heater defined in claim 1 wherein the body is rigid.

8. The electrical sleeve heater defined in claim 1 wherein the body is elastic.

9. The electrical sleeve heater defined in claim 1 wherein the casing is formed with an axially extending slot terminating at the cutout and the thermocouple extends along the slot.

10. The electrical sleeve heater defined in claim 9 wherein the casing is formed axially rearward of the cutout at the slot with a radially throughgoing hole wider than the slot, and the slot is not radially throughgoing along its full length, whereby the thermocouple and body can be threaded through the hole for installation in the casing.

11. The electrical sleeve heater defined in claim 1 wherein the body is a generally omega-shaped spring.

* * * * *